United States Patent [19]

Wang et al.

[11] Patent Number: 5,700,872
[45] Date of Patent: Dec. 23, 1997

[54] PROCESS FOR MAKING BLENDS OF POLYOLEFIN AND POLY(ETHYLENE OXIDE)

[75] Inventors: James Hongxue Wang; David Michael Schertz, both of Appleton, Wis.

[73] Assignee: Kimberly Clark Worlwide, Inc., Neenah, Wis.

[21] Appl. No.: 777,226

[22] Filed: Dec. 31, 1996

[51] Int. Cl.⁶ .................................................. C08L 71/02
[52] U.S. Cl. ........................... 525/187; 525/64; 525/931
[58] Field of Search ............................. 525/187, 931, 525/64

[56] References Cited

U.S. PATENT DOCUMENTS

| | | | |
|---|---|---|---|
| 3,323,978 | 6/1967 | Rasmussen | 161/169 |
| 3,539,666 | 11/1970 | Schirmer | 264/51 |
| 3,666,737 | 5/1972 | Lal et al. | 525/187 |
| 3,717,541 | 2/1973 | Schirmer | 161/169 |
| 3,833,708 | 9/1974 | Miller et al. | 264/344 |
| 3,935,141 | 1/1976 | Potts et al. | 260/23 H |
| 3,954,928 | 5/1976 | Omori et al. | 264/51 |
| 4,018,729 | 4/1977 | Faucher et al. | 260/17 R |
| 4,080,405 | 3/1978 | Agouri et al. | 260/878 R |
| 4,186,233 | 1/1980 | Krajewski et al. | 428/213 |
| 4,528,334 | 7/1985 | Knopf et al. | 525/404 |
| 4,868,222 | 9/1989 | Chau et al. | 521/61 |
| 5,095,619 | 3/1992 | Davis et al. | 30/41 |
| 5,300,574 | 4/1994 | Bacskai | 525/181 |
| 5,346,959 | 9/1994 | Goman (Gomez) | 525/187 |
| 5,367,003 | 11/1994 | Petcavich | 523/124 |
| 5,369,168 | 11/1994 | Famili et al. | 525/57 |
| 5,391,423 | 2/1995 | Wnuk et al. | 428/217 |
| 5,395,308 | 3/1995 | Fox et al. | 604/15 |
| 5,415,905 | 5/1995 | Middlesworth et al. | 528/35.7 |
| 5,417,679 | 5/1995 | Toms et al. | 604/370 |
| 5,429,874 | 7/1995 | VanPutte | 428/522 |
| 5,446,100 | 8/1995 | Durrance et al. | 525/221 |
| 5,468,259 | 11/1995 | Sheth et al. | 8/497 |
| 5,489,470 | 2/1996 | Noda | 428/286 |
| 5,498,692 | 3/1996 | Noda | 528/361 |
| 5,498,785 | 3/1996 | Wang et al. | 525/371 |
| 5,509,913 | 4/1996 | Yeo | 604/364 |
| 5,532,066 | 7/1996 | Latiolais et al. | 428/483 |
| 5,540,663 | 7/1996 | Kroner et al. | 428/221 |
| 5,549,791 | 8/1996 | Herron et al. | 162/157.6 |

FOREIGN PATENT DOCUMENTS

| | | | |
|---|---|---|---|
| 52355/93 | 3/1994 | Australia | C08L 71/02 |
| 0 184 440 A2 | 6/1986 | European Pat. Off. | B26B 21/24 |
| 49-126742 | 12/1974 | Japan . | |
| 61-272217 A | 12/1986 | Japan | C08F 255/02 |
| 2 295 553 | 6/1996 | United Kingdom | A61F 13/15 |
| WO 94/00163 | 1/1994 | WIPO | A61L 15/24 |
| WO 94/00293 | 1/1994 | WIPO | B32B 27/08 |
| WO 95/11929 | 5/1995 | WIPO | C08F 8/00 |
| WO 95/20614 | 8/1995 | WIPO | C08G 63/08 |
| WO 95/20615 | 8/1995 | WIPO | C08G 63/08 |
| WO 95/20621 | 8/1995 | WIPO | C08J 5/18 |
| WO 95/23249 | 8/1995 | WIPO | D01D 5/098 |
| WO 95/23250 | 8/1995 | WIPO | D01D 5/40 |
| WO 96/21057 | 7/1996 | WIPO | D04H 1/42 |
| WO 96/21475 | 7/1996 | WIPO | A61L 15/30 |

OTHER PUBLICATIONS

Bartczak, Z. and A. Galeski, "Changes in Interface Shape During Crystallization in Two–Component Polymer Systems," *Polymer*, 1986, vol. 27, Apr., pp. 544–548.

Mortensen, Kell, "Phase Behaior of Poly(propylene Oxide)–Poly(ethylene oxide)–Poly(propylene oxide) Triblock Copolymer Melt and Aqueous Solutions," *Macromolecules*, vol. 27, No. 20, 1994, pp. 5654–5666.

Song, Z. and W. E. Baker, "Melt Grafting of T–Butylaminoethyl Methacrylate Onto Polyethylene," *Polymer*,1992, vol. 33, No. 15, pp. 3266–3273.

Tang, Tao and Baotong Huang, "Compatibilization of Polypropylene/Poly (Ethylene Oxide) Blends and Crystallization Behavior of the Blends," *Journal of Polymer Science: Part B: Polymer Physics*, vol. 32, (1994), pp. 1991–1998.

American Society for Testing and Material (ASTM) Designation: D 638–95, "Standard Test Method for Tensile Properties of Plastics," pp. 45–56, published Dec. 1995.

*Primary Examiner*—Ana Woodward
*Attorney, Agent, or Firm*—Mark L. Davis

[57] ABSTRACT

A compositional blend having from about 1 weight percent to about 85 weight percent of a modified polyolefin and from about 99 weight percent to about 15 weight percent of modified poly(ethylene oxide). The modified polyolefin and modified poly(ethylene oxide) have a total of from about 1 weight percent to about 30 weight percent of a monomer grafted thereto. Included is a method for making the blend comprising using a single pass extruder to perform the steps of melt blending the polyolefin, poly(ethylene oxide), the monomer and a sufficient amount free radical initiator to graft from about 1 percent to 100 percent of the monomer onto the polyolefin and poly(ethylene oxide).

27 Claims, No Drawings

PROCESS FOR MAKING BLENDS OF POLYOLEFIN AND POLY(ETHYLENE OXIDE)

FIELD OF THE INVENTION

The present invention relates to blends of polyolefin and poly(ethylene oxide) and a method of making the blends. More particularly, the invention relates to blends having up to about 85 weight percent of a modified polyethylene or modified polypropylene and a modified poly(ethylene oxide) and a method of making the modified polyolefin and modified poly(ethylene oxide) blend using a single step reactive extruder.

BACKGROUND OF THE INVENTION

Personal care products, such as, diapers, sanitary napkins, adult incontinence garments, and the like are generally constructed from a number of different components and materials. Such articles typically have a portion, usually the backing layer, liner, or baffle constructed of a liquid repellent film material. This repellent material is appropriately constructed to minimize or prevent the exudation of the absorbed liquid from the article and to obtain greater utilization of the absorbent capacity of the product. The liquid repellent film commonly used includes plastic materials such as polyethylene films and the like.

Although such products are relatively inexpensive, sanitary and easy to use disposal of a product once soiled is not without its problems. With greater interest being placed in protecting the environment today, there is a need to develop materials that are more compatible with the existing and developing waste disposal technologies while still delivering performance consumers have come to expect. An ideal disposal alternative would be to use municipal sewage treatment and private residential septic systems. Products suited for disposal in sewage systems can be flushed down a convenient toilet and are termed "flushable." While flushing such articles would be convenient, the liquid repellent material which normally does not disintegrate in water tends to plug toilets and sewer pipes. It therefore becomes necessary, although undesirable, to separate the barrier film material from the absorbent article prior to flushing.

In addition to the article itself, typically the packaging in which the disposable article is distributed is also made from a water resistant material. Water resistivity is necessary to prevent the degradation of the packaging from environmental conditions and to protect the disposable articles therein. Although this packaging may be safely stored with other refuse for commercial disposal, and especially in the case of individual packaging of the products, it is often more convenient to dispose of the packaging in the toilet with the discarded disposable article. However, in the cases where such packaging is composed of a water resistant material, plugging of the drains to the toilet typically results.

In an effort to overcome these deficiencies, two methodologies have been utilized. The first is for hydrophilic materials to be treated with a hydrophobic material to impart the desired water resistant properties to the material.

The second method has been to modify a water resistant polymer. One of the more useful ways of modifying polymers involves blending them with other polymers of different structures and properties. In a few cases, polymer blend combinations are thermodynamically miscible and exhibit physical and mechanical compatibility. However, by far a greater number of blends are phase separated and generally exhibit poor mechanical compatibility. Phase separated blends can in some cases exhibit physical and mechanical compatibility where the polymer compositions are similar, for example, polyolefin blended with other similar polyolefins, or where interfacial agents are added to improve the compatibility at the interface between the constituents of the polymer blend.

Polymer blends of polyolefins and poly(ethylene oxide) are melt processible but exhibit very poor mechanical compatibility. This poor mechanical compatibility is manifested in the mechanical property profile of the blends relative to the properties of the unblended constituents.

In view of the problems of the prior art, it remains highly desirable to provide a water responsive material. Such blends could be used for making flushable barrier films, extrusion applications and injected molded articles.

SUMMARY OF THE INVENTION

Briefly, one aspect of the present invention provides for a modified polyolefin and modified poly(ethylene oxide) blend composition. The blend composition is composed of from about 1 weight percent to about 85 weight percent of a modified polyolefin and from about 99 weight percent to about 15 weight percent of a modified poly(ethylene oxide). The modified polyolefin and modified poly(ethylene oxide) have grafted thereto from about 1 weight percent to about 30 weight percent, based on the weight of the polyolefin and poly(ethylene oxide), of a monomer.

Another aspect of the invention provides for a method of making the modified polyolefin and modified poly(ethylene oxide) blend composition. The method provides a single pass, melt reactive extrusion modification of the polyolefin and poly(ethylene oxide). This single step process affords significant advantages over a two step process where the polyolefin is first modified by grafting a monomer onto the polyolefin backbone which is then re-extruded with the poly(ethylene oxide). A few of the advantages include cost savings, reduced polymer degradation and greater uniformity in the final product. Specifically, the method of preparing the blend of modified polyolefin and modified poly (ethylene oxide) using a single pass, melt reactive extruder comprises melting the polyolefin and poly(ethylene oxide) in the extruder and adding to the polyolefin and poly (ethylene oxide) blend a monomer and a sufficient amount of a free radical initiator to graft from about 1 weight percent to about 100 weight percent of the monomer onto the polyolefin and poly(ethylene oxide).

It is an object of the invention to provide a blend composition comprising a modified polyolefin and modified poly(ethylene oxide). More specifically, it is an object of the invention to provide a blend composition comprising a modified polyethylene or modified polypropylene and modified poly(ethylene oxide).

Another object of the invention is to provide a method of making a modified polyolefin and modified poly(ethylene oxide) blend composition using a single pass reactive extruder.

As used herein "reactive extrusion" is the use of chemical reactions during polymer extrusion to form desired products. Free radical initiator, crosslinking agents, and other reactive additives can be injected into the extruder to cause such reactions.

DETAILED DESCRIPTION OF THE INVENTION

The mechanical and visual compatibility of blends of polyolefins and poly(ethylene oxide) is very poor. However, it has now unexpectedly been found that polyolefins and poly(ethylene oxide) can be modified with one or more monomers, such that materials made from blends having upwards of about 85 weight percent of a modified polyolefin and as little as 15 weight percent of a modified poly(ethylene oxide) are water responsive. More specifically, it has been found that blends of polyolefins and poly(ethylene oxide), when grafted with a monomer during reactive extrusion imparts water responsiveness to films and thermoplastic articles made therefrom. Accordingly, one aspect of the invention is for a composition of matter comprising a polymer blend having from about 1 weight percent to about 85 weight percent of a modified polyolefin and from about 99 weight percent to about 15 weight percent of a modified poly(ethylene oxide). Preferably, the blend comprises from about 30 weight percent to about 85 weight percent of a modified polyolefin and from about 70 weight percent to about 15 weight percent of modified poly(ethylene oxide). More preferably, the blend comprises from about 55 weight percent to about 85 weight percent of a modified polyolefin and from about 45 weight percent to about 15 weight percent of modified poly(ethylene oxide).

The amount of monomer added to the blend of polyolefin and poly(ethylene oxide) is from about 1 weight percent to about 30 weight percent, preferably, from about 1 weight percent to about 20 weight percent and more preferably, from about 1 weight percent to about 10 weight percent wherein all such ranges are based on the total weight of the polyolefin and poly(ethylene oxide).

The saturated ethylene polymers useful in the practice of this invention are homopolymers or copolymers of ethylene and polypropylene and are essentially linear in structure. As used herein, the term "saturated" refers to polymers which are fully saturated, but also includes polymers containing up to about 5% unsaturation. The homopolymers of ethylene include those prepared under either low pressure, i.e., linear low density or high density polyethylene, or high pressure, i.e., branched or low density polyethylene. The high density polyethylenes are generally characterized by a density that is about equal to or greater than 0.94 grams per cubic centimeter (g/cc). Generally, the high density polyethylenes useful as the base resin in the present invention have a density ranging from about 0.94 g/cc to about 0.97 g/cc. The polyethylenes can have a melt index, as measured at 2.16 kg and 190° C., ranging from about 0.005 decigrams per minute (dg/min) to 100 dg/min. Desirably, the polyethylene has a melt index of 0.01 dg/min to about 50 dg/min and more desirably of 0.05 dg/min to about 25 dg/min. Alternatively, mixtures of polyethylene can be used as the base resin in producing the graft copolymer compositions, and such mixtures can have a melt index greater than 0.005 dg/min to less than about 100 dg/min.

The low density polyethylene has a density of less than 0.94 g/cc and are usually in the range of 0.91 g/cc to about 0.93 g/cc. The low density polyethylene polymer has a melt index ranging from about 0.05 dg/min to about 100 dg/min and desirably from 0.05 dg/min to about 20 dg/min. Ultra low density polyethylene can be used in accordance with the present invention. Generally, ultra low density polyethylene has a density of less than 0.90 g/cc.

Generally, polypropylene has a semi-crystalline structure having a molecular weight of about 40,000 or more, a density of about 0.90 g/cc, a melting point of 168° to 171° C. for isotactic polypropylene and a tensile strength of 5000 psi. Polypropylene can also have other tacticities including syndiotactic and atactic.

The above polyolefins can also be manufactured by using the well known multiple-site Ziegler-Natta catalysts or the more recent single-site metallocene catalysts. The metallocene catalyzed polyolefins have better controlled polymer microstructures than polyolefins manufactured using Ziegler-Natta catalysts, including narrower molecular weight distribution, well controlled chemical composition distribution, co-monomer sequence length distribution, and stereoregularity. Metallocene catalysts are known to polymerize propylene into atactic, isotactic, syndiotactic, isotactic-atactic steroblock copolymer.

Copolymers of ethylene which can be useful in the present invention may include copolymers of ethylene with one or more additional polymerizable, unsaturated monomers. Examples of such copolymers include, but are not limited to, copolymers of ethylene and alpha olefins (such as propylene, butene, hexene or octene) including linear low density polyethylene, copolymers of ethylene and vinyl esters of linear or branched carboxylic acids having 1–24 carbon atoms such as ethylene-vinyl acetate copolymers, and copolymers of ethylene and acrylic or methacrylic esters of linear, branched or cyclic alkanols having 1–28 carbon atoms. Examples of these latter copolymers include ethylene-alkyl (meth)acrylate copolymers, such as ethylene-methyl acrylate copolymers.

The free radical initiators useful in the practice of this invention include acyl peroxides such as benzoyl peroxide; dialkyl; diaryl; or aralkyl peroxides such as di-t-butyl peroxide; dicumyl peroxide; cumyl butyl peroxide; 1,1-di-t-butyl peroxy-3,5,5-trimethylcyclohexane; 2,5-dimethyl-2,5-di(t-butylperoxy) hexane; 2,5-dimethyl-2,5-bis (t-butylperoxy) hexyne-3 and bis(a-t-butyl peroxyisopropylbenzene); peroxyesters such as t-butyl peroxypivalate; t-butyl peroctoate; t-butyl perbenzoate; 2,5-dimethylhexyl-2,5-di(perbenzoate); t-butyl di(perphthalate); dialkyl peroxymonocarbonates and peroxydicarbonates; hydroperoxides such as t-butyl hydroperoxide, p-methane hydroperoxide, pinane hydroperoxide and cumene hydroperoxide and ketone peroxides such as cyclohexanone peroxide and methyl ethyl ketone peroxide. Azo compounds such as azobisisobutyronitrile may also be used.

Poly(ethylene oxide) polymers suitable for the present invention can have a molecular weight ranging from 100,000 to 8,000,000. Poly(ethylene oxide) is available from Union Carbide Corporation under the trade name of POLYOX®. Typically, poly(ethylene oxide) is a dry free flowing white powder having a crystalline melting point in the order of about 65° C., above which poly(ethylene oxide) resin becomes thermoplastic and can be formed by molding, extrusion and other methods known in the art.

The method of making the polymer blends includes melt blending the desired weight ratios of a mixture of the polyolefin, poly(ethylene oxide), the monomer and a free radical initiator in an extruder and at a reaction temperature where the polyolefin and poly(ethylene oxide) are converted to a molten state. Accordingly, the polyolefin, poly(ethylene oxide), monomer and free radical initiator can be simultaneously added to the extruder before the polymer constituents, i.e., the polyolefin and poly(ethylene oxide) have been melted. The preferred monomers used in the present invention are 2-hydroxyethyl methacrylate and polyethylene glycol ethyl ether (meth)acrylate, both are available from Aldrich Chemical Company, Milwaukee, Wis. Preferably, the melt extruder used for melt blending can introduce various constituents into the blend at different locations along the screw length. For example, the free radical initiator, crosslinking agents, or other reactive additives can be injected into the blend before or after one or more of the polymer constituents is melted or thoroughly mixed. More preferably, the polyolefin and poly(ethylene oxide) are added at the beginning of the extruder. After melting, the monomer is added to melted polymers and further down the extruder barrel, the free radical initiator is fed to the melt blend. Although not preferred the scope of the invention would include simultaneously adding the monomer and free radical initiator into the molten blend of polyolefin and poly(ethylene oxide). It is important to the method of the invention that the polyolefin and poly(ethylene oxide) be melt blended contemporaneously with or before the addition of the monomer and free radical initiator. Although not to be bound by any theory, it is believed that the monomer, in the presence of the free radical initiator, grafts onto both the polyolefin and poly(ethylene oxide) thereby allowing articles made from the blend of modeled polyolefin and modified poly(ethylene oxide) to have a greater water responsiveness. As used herein the term "water responsiveness" refers to a loss of tensile strength or strain-to-break of a wet film relative to the dry film tensile strength or strain-to-break.

The amount of free radical initiator added to the extruder should be an amount sufficient to graft from about 1 percent to 100 percent of the monomer onto the polyolefin and poly(ethylene oxide). This can range from about 0.1 weight percent to about 10 weight percent of initiator. Preferably, the amount of initiator added to the extruder ranges from about 0.1 weight percent to about 5 weight percent wherein all such ranges are based on the amount of monomer added to the melt blend.

Surprisingly, a film or other thermoplastic article made from the modified polyolefin and modified poly(ethylene oxide) blend described above is water responsive.

The present invention is illustrated in greater detail by the specific examples presented below. It is to be understood that these examples are illustrative embodiments and are not intended to be limiting of the invention, but rather are to be construed broadly within the scope and content of the appended claims.

In each of the Examples which follow a polyolefin/poly(ethylene oxide) blend was prepared as described. Comparative Example A is a physical blend of the polymer resins. The blends of Comparative Examples B–D were prepared by a two-step process. In the first step the polyethylene was modified by grafting a monomer thereto. The method of making the modified polyethylene is described in greater detail in the copending U.S. patent application having U.S. Ser. No. 08/733,410 filed on Oct. 18, 1996 the entire disclosure of which is incorporated herein by reference. In the second step the modified polyolefin is blended with the poly(ethylene oxide). Select properties of these materials are in Table 1 below. Examples 1–4, 5–8 and 9–10 were made in accordance with the present invention. Select properties of these materials are in Tables 2, 3 and 4 respectively.

COMPARATIVE EXAMPLE A

A 60/40 weight percent resin blend of low density polyethylene having a melt index of 1.9 decigrams per minute (dg/min) and a density of 0.917 grams per cubic centimeter (g/cc) (Dow 503I; available from Dow Chemical Company, Midland, Mich.) and poly(ethylene oxide) having a molecular weight of 200,000 g/mol. (POLYOX® WSRN-80 available from Union Carbide Corp.) were fed to a Haake counter-rotating twin screw extruder at a rate of 5 pounds per hour (lb/hr). The extruder had a length of 300 millimeters. Each conical screw had 30 millimeters diameter at the feed port and a diameter of 20 millimeters at the die. The extruder had four heating zones set at 170, 180, 180 and 190 degrees Centigrade (C). The screw speed of the extruder was 150 rpm.

COMPARATIVE EXAMPLES B–D

For Comparative Examples B–D the low density polyethylene, Dow 503I, was modified by grafting thereto polyethylene glycol methacrylate (PEG-MA; available from Aldrich Chemical Company, Milwaukee, Wis.). The PEG-MA grafted polyethylene was prepared using the Haake counter-rotating twin screw extruder described above. The feed to the extruder comprised contemporaneously adding, at the extruder feed throat, 5 lb/hr of polyethylene and the specified amounts of PEG-MA and free radical initiator ((2, 5-dimethyl-2,5-di(t-butylperoxy) hexane, supplied by Atochem, 2000 Market St. Philadelphia, Pa. under the tradename of LUPERSOL 101).

For Comparative Example B the PEG-MA feed rate was 0.125 lb/hr and the initiator rate was 0.0125 lb/hr.

For Comparative Example C the PEG-MA feed rate was 0.25 lb/hr and the initiator rate was 0.025 lb/hr.

For Comparative Example D the PEG-MA feed rate was 0.5 lb/hr and the initiator rate was 0.025 lb/hr.

A 60/40 blend was prepared following the method of Comparative Example A above, except the modified polyethylene of each example was substituted for the unmodified polyethylene. The resulting products had the characteristics indicated in Table 1.

Film processing of the blends was performed using the Haake extruder as described above with the following modifications. The extruder included a 4 inch slit die at a temperature of 195 degrees C. The screw speed was at 30 rpm. A chilled wind-up roll was used to collect the film. The chilled roll was operated at a speed sufficient to form a film having a thickness of about 4 mils (0.004 of an inch) and was maintained at a temperature of about 15–20 degrees C.

Dry and Wet Tensile Tests

Dry tensile tests were performed on a Sintech 1/D tensile tester available from MTS Systems Corp., Machesny Park, Ill. The film was cut into a type V dogbone shape in accordance with ASTM D638. The test was performed with a grip separation of 30 millimeters and a crosshead speed of 4 millimeters/second.

Wet tensile tests were performed on a Vitodyne V1000 mini-tensile tester available from Chatillon, Greensboro, N.C. The film samples were placed in the grippers and submerged in ambient temperature, non-stirred water for 30 seconds. Peak stress, percent strain to break, energy to break (as area under stress versus strain curve), and modulus were calculated for each film tested and the percent loss in tensile properties from dry to wet was determined.

TABLE 1

| | Example #- | | | | | | | |
|---|---|---|---|---|---|---|---|---|
| | #A | | #B | | #C | | #D | |
| | dry | wet | dry | wet | dry | wet | dry | wet |
| Thickness (mil) | 4.5 | 4.4 | 4.5 | 4.5 | 4.0 | 4.0 | 5.0 | 5.0 |
| % Strain | 390 | 390 | 330 | 110 | 320 | 70 | 170 | 30 |
| Peak Stress- (MPa) | 15.3 | 12.8 | 13.8 | 7.0 | 11.4 | 4.9 | 12.2 | 3.1 |
| Energy-break ($\times 10^6$ J/m$^3$) | 42.2 | 41.5 | 32.7 | 6.7 | 27.6 | 2.4 | 16.5 | 0.5 |
| Modulus (MPa) | 181 | 96.5 | 117.8 | 74.4 | 103.7 | 56.3 | 119.4 | 39.4 |

TABLE 1-continued

| | % Loss from Dry to Wet | | | |
|---|---|---|---|---|
| % Strain | 0% | 65% | 79% | 82% |
| Peak Stress | 16% | 49% | 57% | 75% |
| Energy to Break | 2% | 80% | 91% | 97% |
| Modulus | 47% | 37% | 46% | 33% |

EXAMPLES 1–4

The 60/40 weight percent resin blend of low density polyethylene (Dow 503I) and poly(ethylene oxide) (WSRN-80) was fed to the Haake counter-rotating twin screw extruder at a rate of 5 lb/hr. Contemporaneously with the polymer feed to the extruder, specified amounts of the monomer, PEG-MA, and free radical initiator (LUPERSOL 101) were added at the feed throat. The extruder had four heating zones set at 170, 180, 180 and 190 degrees C. The screw speed of the extruder was 150 rpm.

For Example 1 the PEG-MA feed rate was 0.125 lb/hr and the initiator rate was 0.0125 lb/hr.

For Example 2 the PEG-MA feed rate was 0.25 lb/hr and the initiator rate was 0.025 lb/hr.

For Example 3 the PEG-MA feed rate was 0.5 lb/hr and the initiator rate was 0.025 lb/hr.

For Example 4 the PEG-MA feed rate was 0.75 lb/hr and the initiator rate was 0.0375 lb/hr.

The resulting products of Examples 1–4 had the characteristics indicated in Table 2.

TABLE 2

| | Example #- | | | | | | | |
|---|---|---|---|---|---|---|---|---|
| | #1 | | #2 | | #3 | | #4 | |
| | dry | wet | dry | wet | dry | wet | dry | wet |
| Thickness (mil) | 4.4 | 4.4 | 5.6 | 5.5 | 4.2 | 4.2 | 4.9 | 4.6 |
| % Strain | 400 | 70 | 280 | 50 | 590 | 90 | 250 | 50 |
| Peak Stress- (MPa) | 9.3 | 3.7 | 8.3 | 3.1 | 9.2 | 3.5 | 5.2 | 1.3 |
| Energy-break ($\times 10^6$ J/m$^3$) | 30.6 | 1.7 | 18.1 | 0.9 | 46.8 | 2.0 | 9.8 | 0.3 |
| Modulus (MPa) | 90.1 | 41.9 | 91.2 | 32.7 | 86.2 | 38.0 | 64.4 | 14.5 |

| | % Loss from Dry to Wet | | | |
|---|---|---|---|---|
| % Strain | 83% | 83% | 85% | 81% |
| Peak Stress | 60% | 63% | 62% | 75% |
| Energy to Break | 94% | 95% | 96% | 97% |
| Modulus | 53% | 64% | 56% | 77% |

For Examples 1–4 the amount of monomer grafted to polyethylene was 0.65 weight percent, 1.03 weight percent, 0.51 weight percent and 1.13 weight percent, respectively. The weight percent of monomer grafted to the polyethylene was determined by FT-IR and elemental oxygen content as described in copending U.S. patent application Ser. No. 08/733,410 filed Oct. 18, 1996 the entire disclosure of which is incorporated herein by reference. For Example 3 the amount of monomer grafted to the poly(ethylene oxide) was determined to be 14.9 weight percent by proton NMR spectroscopy.

EXAMPLES 5–8

The 60/40 weight percent resin blend of low density polyethylene (Dow 503I) and poly(ethylene oxide) (WSRN-80) was fed to the Haake counter-rotating twin screw extruder at a rate of 5 lb/hr. Contemporaneously with the polymer feed to the extruder, specified amounts of a monomer, 2-hydroxyethyl methacrylate, and free radical initiator (LUPERSOL 101) were added at the feed throat. The extruder had four heating zones set at 170, 180, 180 and 190 degrees C. The screw speed of the extruder was 150 rpm.

For Example 5 the 2-hydroxyethyl methacrylate feed rate was 0.125 lb/hr and the initiator rate was 0.0125 lb/hr.

For Example 6 the 2-hydroxyethyl methacrylate feed rate was 0.25 lb/hr and the initiator rate was 0.025 lb/hr.

For Example 7 the 2-hydroxyethyl methacrylate feed rate was 0.5 lb/hr and the initiator rate was 0.025 lb/hr.

For Example 8 the 2-hydroxyethyl methacrylate feed rate was 0.75 lb/hr and the initiator rate was 0.0375 lb/hr.

The resulting products of Examples 5–8 had the characteristics indicated in Table 3.

TABLE 3

| | Example #- | | | | | | | |
|---|---|---|---|---|---|---|---|---|
| | #5 | | #6 | | #7 | | #8 | |
| | dry | wet | dry | wet | dry | wet | dry | wet |
| Thickness (mil) | 4.5 | 4.6 | 4.2 | 4.7 | 4.5 | 4.5 | 5.0 | 4.6 |
| % Strain | 350 | 50 | 390 | 40 | 420 | 40 | 350 | 30 |
| Peak Stress- (MPa) | 13.3 | 3.3 | 9.0 | 1.5 | 10.3 | 2.4 | 8.7 | 1.9 |
| Energy-break ($\times 10^6$ J/m$^3$) | 33.3 | 0.87 | 26.7 | 0.36 | 32.7 | 0.51 | 23.6 | 0.37 |
| Modulus (MPa) | 107 | 38.8 | 126 | 18.4 | 99.6 | 28.7 | 109 | 23.2 |

| | % Loss from Dry to Wet | | | |
|---|---|---|---|---|
| % Strain | 86% | 90% | 90% | 91% |
| Peak Stress | 75% | 83% | 77% | 78% |
| Energy to Break | 97% | 99% | 98% | 98% |
| Modulus | 64% | 85% | 71% | 79% |

EXAMPLE 9

A 30/70 weight percent resin blend of low density polyethylene (Dow 503I) and poly(ethylene oxide) (WSRN-80) was fed to the Haake counter-rotating twin screw extruder at a rate of 5 lb/hr. Contemporaneously with the polymer feed to the extruder, specified amounts of a monomer, polyethylene glycol ethyl ether (meth)acrylate, and free radical initiator (LUPERSOL 101) were added at the feed throat. The extruder had four heating zones set at 170, 180, 180 and 190 degrees C. The screw speed of the extruder was 150 rpm.

For Example 9 the polyethylene glycol ethyl ether (meth)acrylate feed rate was 0.25 lb/hr and the initiator rate was 0.05 lb/hr.

EXAMPLE 10

A 80/20 weight percent resin blend of low density polyethylene (Dow 5031) and poly(ethylene oxide) (WSRN-80) was fed to the Haake counter-rotating twin screw extruder at a rate of 5 lb/hr. Contemporaneously with the polymer feed to the extruder, specified amounts of a monomer, polyethylene glycol ethyl ether (meth)acrylate, and free radical initiator (LUPERSOL 101) were added at the feed throat. The extruder had four heating zones set at 170, 180, 180 and 190 degrees Centigrade (C). The screw speed of the extruder was 150 rpm.

For Example 10 the polyethylene glycol ethyl ether (meth)acrylate feed rate was 0.25 lb/hr (5 weight percent addition) and the initiator rate was 0.05 lb/hr.

TABLE 4

| | Example # | | | |
|---|---|---|---|---|
| | #9 | | #10 | |
| | dry | wet | dry | wet |
| Thickness (mil) | 4.2 | 4.5 | 4.4 | 5.2 |
| % Strain | 260 | 40 | 179 | 150 |
| Peak Stress- (MPa) | 910 | 30 | 12 | 12 |
| % Loss from Dry to Wet | | | | |
| % Strain | 85 | | 17% | |
| Peak Stress | 97 | | 0% | |

While the invention has been described with reference to a preferred embodiment, those skilled in the art will appreciate that various substitutions, omissions, changes and modifications may be made without departing from the spirit hereof. Accordingly, it is intended that the foregoing examples be deemed merely exemplary of the present invention and not be deemed a limitation thereof.

We claim:

1. A method for preparing a blend of a modified polyolefin and modified poly(ethylene oxide) comprising melt blending in a single pass extruder an amount of polyolefin, an amount of poly(ethylene oxide), an amount of monomer and a sufficient amount of free radical initiator to modify said polyolefin and said poly(ethylene oxide) by grafting from about 1 percent to 100 percent of said monomer onto said polyolefin and said poly(ethylene oxide), wherein said monomer is selected from the group consisting of 2-hydroxyethyl methacrylate and polyethylene glycol ethyl ether (meth) acrylate.

2. The method of claim 1 wherein said modified polyolefin comprises from about 1 weight percent to about 85 weight percent of said blend and said modified poly(ethylene oxide) comprises from about 99 to about 15 weight percent of said blend.

3. The method of claim 1 wherein said modified polyolefin comprises from about 30 weight percent to about 85 weight percent of said blend and said modified poly(ethylene oxide) comprises from about 70 to about 15 weight percent of said blend.

4. The method of claim 1 wherein said modified polyolefin comprises from about 55 weight percent to about 85 weight percent of said blend and said modified poly(ethylene oxide) comprises from about 45 to about 15 weight percent of said blend.

5. The method of claim 1 wherein said polyolefin is selected from the group consisting of high density polyethylene, ultra low density polyethylene, low density polyethylene, linear low density polyethylene and polypropylene.

6. The method of claim 1 wherein said free radical initiator is selected from the group consisting of benzoyl peroxide; di-t-butyl peroxide; dicumyl peroxide; cumyl butyl peroxide; 1, 1-di-t-butyl peroxy-3,5,5-trimethylcyclohexane; 2,5-dimethyl-2,5-di(t-butylperoxy) hexane; 2,5-dimethyl-2,5-bis (t-butylperoxy) hexyne-3; bis (a-t-butyl peroxyisopropylbenzene); t-butyl peroxypivalate; t-butyl peroctoate; t-butyl perbenzoate; 2,5-dimethylhexyl-2,5-di(perbenzoate); t-butyl di(perphthalate); t-butyl hydroperoxide; p-methane hydroperoxide; pinane hydroperoxide; cumene hydroperoxide; cyclohexanone peroxide and methyl ethyl ketone peroxide.

7. The method of claim 1 wherein said amount of said free radical initiator added to said extruder is of from about 0.1 weight percent to about 10 weight percent, based on the amount of monomer.

8. The method of claim 1 wherein said amount of monomer added to said extruder is of from about 1 weight percent to about 20 weight percent, based on the total amount of said polyolefin and said poly(ethylene oxide).

9. The method of claim 1 wherein said amount of monomer added to said extruder is of from about 1 weight percent to about 10 weight percent, based on the total amount of said polyolefin and said poly(ethylene oxide).

10. A method for preparing a blend of a modified polyolefin and modified poly(ethylene oxide) comprising using a single pass extruder to perform the steps of:

a) melt blending an amount of polyolefin and poly (ethylene oxide); and b) adding to the melt blended polyolefin and poly (ethylene oxide) an amount of monomer and a sufficient amount of free radical initiator to modify said polyolefin and poly(ethylene oxide) by grafting from about 1 percent to 100 percent of said monomer onto said polyolefin and poly(ethylene oxide), wherein said monomer is selected from the group consisting of 2-hydroxyethyl methacrylate and polyethylene glycol ethyl ether (meth) acrylate.

11. The method of claim 10 wherein said modified polyolefin comprises from about 1 weight percent to about 85 weight percent of said blend and said modified poly (ethylene oxide) comprises from about 99 to about 15 weight percent of said blend.

12. The method of claim 10 wherein said modified polyolefin comprises from about 30 weight percent to about 85 weight percent of said blend and said modified poly (ethylene oxide) comprises from about 70 to about 15 weight percent of said blend.

13. The method of claim 10 wherein said modified polyolefin comprises from about 55 weight percent to about 85 weight percent of said blend and said modified poly (ethylene oxide) comprises from about 45 to about 15 weight percent of said blend.

14. The method of claim 10 wherein said polyolefin is selected from the group consisting of high density polyethylene, ultra low density polyethylene, low density polyethylene, linear low density polyethylene and polypropylene.

15. The method of claim 10 wherein said free radical initiator is selected from the group consisting of benzoyl peroxide; di-t-butyl peroxide; dicumyl peroxide; cumyl butyl peroxide; 1, 1-di-t-butyl peroxy-3,5,5-trimethylcyclohexane; 2,5-dimethyl-2,5-di(t-butylperoxy) hexane; 2,5-dimethyl-2,5-bis (t-butylperoxy) hexyne-3; bis (a-t-butyl peroxyisopropylbenzene); t-butyl peroxypivalate; t-butyl peroctoate; t-butyl perbenzoate; 2,5-dimethylhexyl-2,5-di(perbenzoate); t-butyl di(perphthalate); t-butyl hydroperoxide; p-methane hydroperoxide; pinane hydroperoxide; cumene hydroperoxide; cyclohexanone peroxide and methyl ethyl ketone peroxide.

16. The method of claim 10 wherein said amount of said free radical initiator added to said extruder is of from about 0.1 weight percent to about 10 weight percent, based on the amount of monomer.

17. The method of claim 10 wherein said amount of monomer added to the extruder is of from about 1 weight percent to about 20 weight percent, based on the total amount polyolefin and poly(ethylene oxide).

18. The method of claim 10 wherein said amount of monomer added to the extruder is of from about 1 weight percent to about 10 weight percent, based on the total amount polyolefin and poly(ethylene oxide).

19. A method for preparing a blend of a modified polyolefin and modified poly(ethylene oxide) comprising using a single pass extruder to perform the steps of:

a) melt blending an amount of polyolefin and poly(ethylene oxide);
   b) adding to the melt blended polyolefin and poly(ethylene oxide) from about 1 weight percent to about 30 weight percent, based on the amount of polyolefin and poly(ethylene oxide), of a monomer selected from the group consisting of 2-hydroxyethyl methacrylate and polyethylene glycol ethyl ether methacrylate;
   c) adding to the melt blended constituents of (a) and (b) a sufficient amount of free radical initiator to modify said polyolefin and poly(ethylene oxide) by grafting from about 1 percent to 100 percent of said monomer onto said polyolefin and poly(ethylene oxide).

20. The method of claim 19 wherein said modified polyolefin comprises from about 1 weight percent to about 85 weight percent of said blend and said modified poly(ethylene oxide) comprises from about 99 to about 15 weight percent of said blend.

21. The method of claim 19 wherein said modified polyolefin comprises from about 30 weight percent to about 85 weight percent of said blend and said modified poly(ethylene oxide) comprises from about 70 to about 15 weight percent of said blend.

22. The method of claim 19 wherein said modified polyolefin comprises from about 55 weight percent to about 85 weight percent of said blend and said modified poly(ethylene oxide) comprises from about 45 to about 15 weight percent of said blend.

23. The method of claim 19 wherein said polyolefin is selected from the group consisting of high density polyethylene, ultra low density polyethylene, low density polyethylene, linear low density polyethylene and polypropylene.

24. The method of claim 19 wherein said free radical initiator is selected from the group consisting of benzoyl peroxide; di-t-butyl peroxide; dicumyl peroxide; cumyl butyl peroxide; 1,1-di-t-butyl peroxy-3,5,5-trimethylcyclohexane; 2,5-dimethyl-2,5-di(t-butylperoxy) hexane; 2,5-dimethyl-2,5-bis (t-butylperoxy) hexyne-3; bis (a-t-butyl peroxyisopropylbenzene); t-butylperoxypivalate; t-butylperoctoate; t-butyl perbenzoate; 2,5-dimethylhexyl-2,5-di(perbenzoate); t-butyl di(perphthalate); t-butyl hydroperoxide; p-methane hydroperoxide; pinane hydroperoxide; cumene hydroperoxide; cyclohexanone peroxide and methyl ethyl ketone peroxide.

25. The method of claim 19 wherein said amount of said free radical initiator added to said extruder is from about 0.1 weight percent to about 10 weight percent, based on the amount of monomer.

26. The method of claim 19 wherein the amount of monomer added to the extruder is of from about 1 weight percent to about 20 weight percent, based on the total amount of said polyolefin and said poly(ethylene oxide).

27. The method of claim 19 wherein the amount of monomer added to the extruder is of from about 1 weight percent to about 10 weight percent, based on the total amount of said polyolefin and said poly(ethylene oxide).

* * * * *